United States Patent
Werner et al.

(10) Patent No.: US 10,385,783 B2
(45) Date of Patent: Aug. 20, 2019

(54) TURBOMACHINE SEAL ARRANGEMENT

(71) Applicant: MTU Aero Engines GmbH, Munich (DE)

(72) Inventors: André Werner, Munich (DE); Steffen Schlothauer, Erdweg (DE); Franz Prieschl, Reichertshausen (DE); Thomas Hess, Munich (DE)

(73) Assignee: MTU AERO ENGINES AG, Munich (DE)

( * ) Notice: Subject to any disclaimer, the term of this patent is extended or adjusted under 35 U.S.C. 154(b) by 1268 days.

(21) Appl. No.: 13/746,738

(22) Filed: Jan. 22, 2013

(65) Prior Publication Data

US 2013/0189085 A1 Jul. 25, 2013

(30) Foreign Application Priority Data

Jan. 23, 2012 (DE) .................. 10 2012 200 883

(51) Int. Cl.
*F01D 11/12* (2006.01)
*F02C 7/28* (2006.01)
*F01D 11/08* (2006.01)

(52) U.S. Cl.
CPC .............. *F02C 7/28* (2013.01); *F01D 11/08* (2013.01); *F05D 2230/31* (2013.01); *F05D 2230/311* (2013.01); *F05D 2230/314* (2013.01); *F05D 2230/90* (2013.01); *F05D 2240/11* (2013.01); *F05D 2240/55* (2013.01); *F05D 2250/60* (2013.01); *F05D 2250/61* (2013.01); *F05D 2250/611* (2013.01); *F05D 2260/6022* (2013.01)

(58) Field of Classification Search
CPC .. F02C 7/28; F01D 11/08; F01D 11/12; F01D 11/122; F01D 11/125; F01D 11/127
USPC ............................. 277/414, 415; 415/173.1
See application file for complete search history.

(56) References Cited

U.S. PATENT DOCUMENTS 3,042,365 A * 7/1962 Curtis .................. F01D 11/125
277/414
3,227,600 A 1/1966 Holland
3,649,033 A * 3/1972 Kondo .................. F01D 11/127
277/414
(Continued)

FOREIGN PATENT DOCUMENTS

DE 10259963 A1 7/2004
DE 102004004915 A1 8/2005
(Continued)

OTHER PUBLICATIONS

Chougule, Hasham H., et al. "Low leakage designs for rotor teeth and honeycomb lands in labyrinth seals", Proceedings of ASME Turbo Expo 2008, GT 2008-51024, 2008, 8 pgs.
(Continued)

*Primary Examiner* — Kayla Mccaffrey
(74) *Attorney, Agent, or Firm* — Abel Schillinger, LLP

(57) ABSTRACT

The present invention relates to a seal arrangement for a turbomachine, in particular a gas turbine, having a plurality of rows, arranged in succession in the axial direction (A), of shells (1-3) connected to one another in the circumferential direction (U), wherein shells adjacent in the axial direction have cross sections opened counter to a throughflow direction (A) and/or a thread axis inclined counter to the throughflow direction.

18 Claims, 1 Drawing Sheet

(56) References Cited

U.S. PATENT DOCUMENTS

| | | | | |
|---|---|---|---|---|
| 3,844,011 | A | * | 10/1974 | Davies .................. B22F 3/1109 419/9 |
| 3,867,061 | A | * | 2/1975 | Moskowitz ........... F01D 11/127 415/135 |
| 4,063,742 | A | * | 12/1977 | Watkins, Jr. ............ F01D 11/02 277/414 |
| 4,218,066 | A | | 8/1980 | Ackermann |
| 4,239,452 | A | * | 12/1980 | Roberts, Jr. ............. F01D 11/12 415/173.5 |
| 4,767,266 | A | * | 8/1988 | Holz ....................... F01D 11/08 277/412 |
| 5,197,281 | A | * | 3/1993 | Przytulski ............... B64C 11/48 29/889.21 |
| 5,520,508 | A | * | 5/1996 | Khalid .................... F01D 11/08 415/119 |
| 5,756,217 | A | | 5/1998 | Schroeder et al. |
| 6,171,351 | B1 | | 1/2001 | Schroeder et al. |
| 6,457,939 | B2 | | 10/2002 | Chasripoor et al. |
| 6,485,025 | B1 | | 11/2002 | Hammersley et al. |
| 6,887,528 | B2 | | 5/2005 | Lau et al. |
| 7,029,232 | B2 | | 4/2006 | Tuffs et al. |
| 8,277,194 | B2 | | 10/2012 | Jabado et al. |
| 2001/0004436 | A1 | | 6/2001 | Chasripoor et al. |
| 2004/0115357 | A1 | | 6/2004 | Lau et al. |
| 2004/0265120 | A1 | | 12/2004 | Tuffs et al. |
| 2005/0003172 | A1 | | 1/2005 | Wheeler et al. |
| 2006/0131815 | A1 | | 6/2006 | Meier |
| 2007/0273103 | A1 | * | 11/2007 | Meier .................. F01D 11/001 277/414 |
| 2009/0041610 | A1 | | 2/2009 | Meier |
| 2009/0072488 | A1 | | 3/2009 | Ramerth et al. |
| 2009/0092498 | A1 | | 4/2009 | Jabado et al. |
| 2009/0304497 | A1 | | 12/2009 | Meier et al. |
| 2013/0017072 | A1 | | 1/2013 | Ali et al. |

FOREIGN PATENT DOCUMENTS

| | | | |
|---|---|---|---|
| DE | 102012106175 | A1 | 1/2013 |
| EP | 0702130 | A2 | 3/1996 |
| EP | 1452696 | A * | 1/2004 |
| EP | 1808508 | A1 | 7/2007 |
| WO | 0058607 | A1 | 10/2000 |
| WO | 0242610 | A2 | 5/2002 |
| WO | 2005073518 | A1 | 8/2005 |
| WO | 2007085230 | A1 | 8/2007 |

OTHER PUBLICATIONS

Jun Li et al., "Numerical Investigations on Leakage Performance of the Rotating Labyrinth Honeycomb Seal", Journal of Engineering for Gas Turbines and Power, Jun. 2010, vol. 132, 11 pgs.

Dermot, Collins, et al., "Numerical modelling of three dimensional honeycomb labyrinth seals employing a simplified approach", Proceedings of ASME Turbo Expo 2006, GT 200690850, 2006, 12 pgs.

* cited by examiner

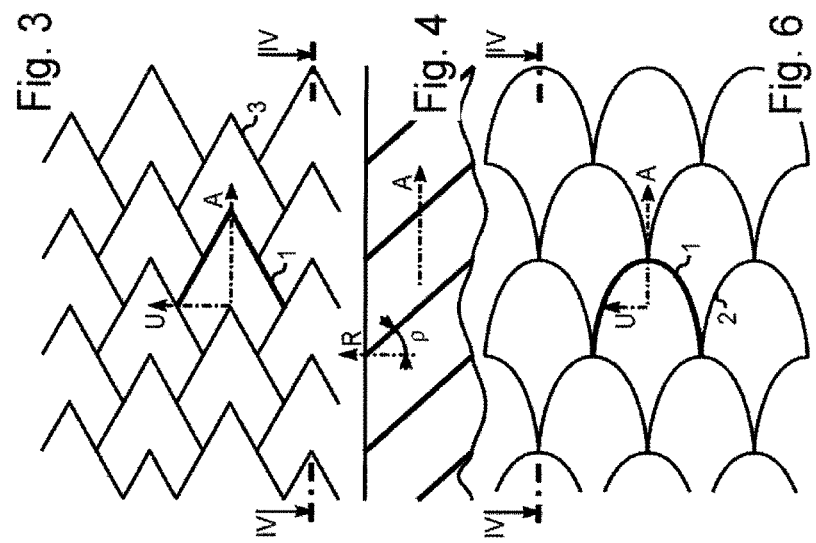
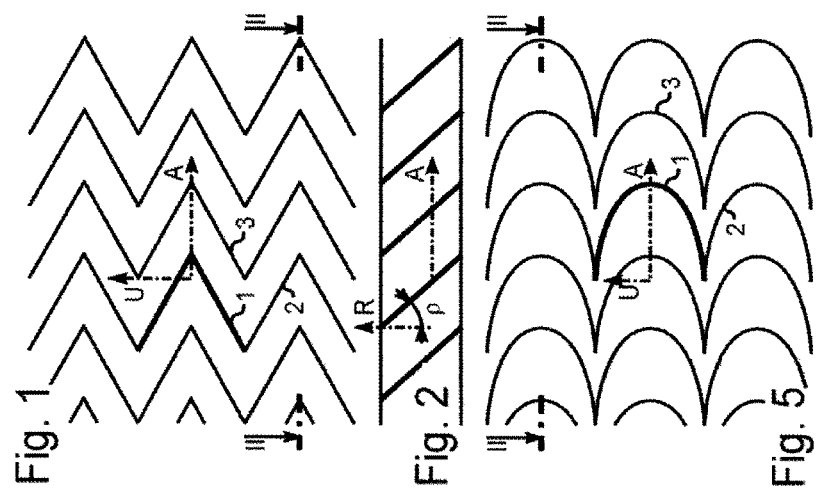

TURBOMACHINE SEAL ARRANGEMENT

CROSS-REFERENCE TO RELATED APPLICATIONS

The present application claims priority under 35 U.S.C. § 119 of German Patent Application No. 10 2012 200 883.7, filed Jan. 23, 2012, the entire disclosure of which is expressly incorporated by reference herein.

BACKGROUND OF THE INVENTION

1. Field of the Invention

The present invention relates to a seal arrangement for a turbomachine, in particular a gas turbine, to a turbomachine comprising such a seal arrangement and also to a process for producing such a seal arrangement.

2. Discussion of Background Information

In turbomachines, leakage flows through radial gaps between the rotor and the stator, for example between the tips or shrouds of rotor blades and the housing and/or between the tips or shrouds of guide vanes and the rotor, impair the efficiency.

In order to reduce such leakage flows, use is customarily made of honeycomb seals, as are described for instance in WO 02/42610 A2, the entire disclosure of which is incorporated by reference herein. Such honeycomb seals mirror-symmetrical in the axial direction can be improved.

SUMMARY OF THE INVENTION

The present invention provides a seal arrangement for a turbomachine, in particular a gas turbine. The arrangement comprises a plurality of rows, arranged in succession in axial direction (A), of shells (1-3) connected to one another in circumferential direction (U). Shells adjacent in the axial direction have cross sections opened counter to a throughflow direction (A) and/or a thread axis inclined counter to the throughflow direction.

In one aspect of the arrangement, shells (1,2) adjacent in circumferential direction may communicate with one another in circumferential direction and/or may delimit cells closed in circumferential direction.

In another aspect, shells may at least substantially have a V-shaped or U-shaped cross section.

In yet another aspect, cross sections of shells (1, 3) arranged in succession in axial direction may be aligned in axial direction.

In a still further aspect, a thread axis of a shell may be inclined at an angle to a radial direction of at least 5° and/or at most 60°, for example, at least 10° and/or at most 50°.

In yet another aspect of the arrangement, shells thereof may have been produced in layers by a generative process.

The present invention also provides a turbomachine, in particular a gas turbine, which turbomachine comprises the seal arrangement of the present invention as set forth above (including the various aspects thereof).

In one aspect of the turbomachine, the seal arrangement may be arranged on a rotor and/or a stator of the turbomachine.

The present invention also provides a process for producing the seal arrangement of the present invention. The process comprises producing shells of the seal arrangement in layers by a generative process.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description in combination with the drawings making apparent to those skilled in the art how the several forms of the present invention may be embodied in practice.

A seal arrangement according to the invention is intended to be arranged on a rotor and/or stator of a turbomachine, in particular of a gas turbine, preferably of an aircraft engine. In particular, a seal arrangement according to the invention can be arranged on tips or shrouds of rotor blades and/or on an opposing housing and/or on tips or shrouds of guide vanes and/or on an opposing rotor surface of one or more compressor and/or turbine stages of a gas turbine, in particular of an aircraft engine.

A seal arrangement according to the invention has two or more rows of shells. Two or more shells in a row are formed connected to one another, in particular integrally to one another, in the circumferential direction, and in a preferred embodiment merge into one another, in particular in an edge or a radius. The rows are arranged in succession in the axial direction.

In the present case, a wall or a profile which extends substantially in the radial direction is denoted as a shell. In a developed view or a section with a constant radius in relation to the axis of rotation of the turbomachine, such a shell has an open cross section. The area centroids of the cross sections lying one above another in the radial direction define a thread axis of the shell.

The thread axis of one or more shells, preferably all shells, of the seal arrangement is inclined counter to a throughflow direction. A thread axis is inclined counter to a throughflow direction in particular when a cross section of the shell which is closer in the radial direction to a gap between the rotor and the stator or to a free surface or seal surface of the seal arrangement is offset counter to the throughflow direction in comparison with a cross section of the shell which is at a greater distance from a gap between the rotor and the stator or a free surface or seal surface of the seal arrangement. In other words, in the throughflow direction a cross section which is at a greater distance from a gap between the rotor and the stator or a free surface or seal surface of the seal arrangement lies downstream in relation to a cross section which is closer to a gap between the rotor and the stator or to a free surface or seal surface of the seal arrangement. In a preferred development, the thread axis is additionally inclined in the circumferential direction; similarly, it may also lie, at least substantially, completely in a meridian plane or may not be inclined in the circumferential direction.

Directional indications, in particular the circumferential, radial and axial directions, relate in particular to a seal arrangement arranged on the turbomachine. The (main) direction of flow of a leakage flow which is to be reduced by the seal arrangement is denoted in particular as the throughflow direction. A throughflow direction may be defined in particular by a higher to a lower pressure level of the turbomachine and/or may be parallel to the axis of rotation or axial direction of the turbomachine.

In addition or as an alternative, two or more, preferably all, shells adjacent in the axial direction have cross sections opened counter to the throughflow direction. A cross section is opened counter to the throughflow direction in particular when it is formed concavely in relation to the throughflow direction and/or collects a flow downstream in the throughflow direction.

By virtue of shells which are formed concavely counter to the throughflow direction—owing to the inclination of their thread axes—in the radial direction and/or—owing to the opened cross sections—in a developed view or a section in the circumferential and axial direction, it is advantageous that the flow resistance against a leakage flow can be increased and thus the leakage flow can be reduced and the efficiency of the turbomachine can be increased. The leakage flow is, as it were, "trapped" or "absorbed" by the shells applied against it.

In a preferred embodiment, some or all shells adjacent in the circumferential direction communicate with one another in the circumferential direction. In other words, fluid can flow in the circumferential direction between adjacent rows of shells, and the seal arrangement is open in the circumferential direction or tangentially. In contrast to known seal arrangements with closed honeycombs, it is thus possible in particular to take into account inhomogeneities distributed over the circumference and/or a circumferential component of the leakage flow.

Equally, some or all shells adjacent in the circumferential direction may delimit cells closed in the circumferential direction. In other words, no fluid flow is possible in the circumferential direction between adjacent shells. This makes it possible to increase in particular the stability of the seal arrangement.

In a preferred embodiment, one or more, in particular all, shells at least substantially have a constant cross section along the thread axis. Equally, the cross section may vary along the thread axis, preferably congruently. In a preferred embodiment, the cross section is at least substantially V-shaped or U-shaped at least in certain portions, preferably along the entire thread axis. A V-shaped cross section is understood to mean, in particular, a cross section arrowed counter to the throughflow direction, with two at least substantially straight legs, which open toward the throughflow, merge into one another in an edge or a radius and in a preferred development are oriented symmetrically in relation to the axial direction. A U-shaped cross section is understood to mean, in particular, a cross section open counter to the throughflow direction, with two at least substantially parallel legs, which merge into one another in a curve or a straight line perpendicular to the leg downstream in the direction of throughflow.

In a preferred embodiment, cross sections of shells arranged in succession in the axial direction are aligned in the axial direction. This is to be understood to mean, in particular, that cross sections adjacent in the axial direction merge into one another by pure displacement in the axial direction and/or cross sections adjacent in the axial direction have the same meridian plane of symmetry. By way of example, V-shaped cross sections are aligned within the meaning of the present invention particularly when the tips thereof lie in the same meridian plane. A section which contains the axis of rotation of the turbomachine is denoted in particular as the meridian plane.

In a preferred embodiment, the thread axes of two or more, in particular all, shells are at least substantially parallel to one another. One or more, in particular all, thread axes may be straight in certain portions or over the entire length thereof. Equally, thread axes may be curved in certain portions or over the entire length thereof; in this case, for an angle or an inclination of the thread axis, reference is made to the tangent on the curved thread axis. A curved thread axis is accordingly inclined counter to the throughflow direction in particular when one or more, in particular all, tangents on the thread axis are inclined counter to the throughflow direction.

In a preferred embodiment, the thread axes of two or more, in particular all, shells are inclined at an angle to the radial direction of at least 5°, in particular at least 10° and/or at most 60°, in particular at most 50°. These angle ranges have proved to be particularly advantageous in terms of flow and strength. They correspond in particular to a (complementary) angle to the axial and/or throughflow direction of at most 85°, in particular at most 80° and/or at least 30°, in particular at least 40°.

In a preferred embodiment, some, in particular all, shells of the seal arrangement are produced in layers by means of a generative process. In this respect, in a preferred development, a powder or fluid layer is consolidated in certain regions by physical means, in particular optically and/or thermally, preferably by means of a laser and/or a mask, and/or by chemical means, in particular by means of at least one nozzle, and in the process joined to an underlying layer. This process is particularly suitable for producing the concave shell arrangement.

BRIEF DESCRIPTION OF THE DRAWINGS

Additional advantageous embodiments of the present invention are set forth in the following description and the drawings. In the drawings, in partially schematized form:

FIG. 1: shows a plan view of part of a seal arrangement of a gas turbine according to one embodiment of the present invention;

FIG. 2: shows a meridian plane along the line II-II in FIGS. 1 and 5;

FIG. 3: shows a seal arrangement according to a further embodiment of the present invention in an illustration corresponding to FIG. 1;

FIG. 4: shows a meridian plane along the line IV-IV in FIGS. 3 and 6;

FIG. 5: shows a seal arrangement according to a further embodiment of the present invention in an illustration corresponding to FIG. 1; and FIG. 6: shows a seal arrangement according to a further embodiment of the present invention in an illustration corresponding to FIG. 3.

FIG. 1 shows a plan view counter to a radial direction R (cf. FIG. 2) of part of a seal arrangement of a gas turbine according to one embodiment of the present invention. It is possible to see six rows, lying in succession in the axial direction A, of in each case three shells arranged alongside one another in the circumferential direction U and connected to one another. Of these shells, one shell 1 is highlighted in bold for illustration, and a shell 3 adjacent thereto downstream in the direction of throughflow in the axial direction and a shell 2 adjacent in the circumferential or rotational direction are provided with reference signs for easier addressing. The seal arrangement extends over at least an axial portion of a lateral surface, facing a radial gap, of a rotor blade tip or of a rotor blade shroud, of a guide vane tip or of a guide vane shroud, and/or of an opposing lateral surface of the housing or rotor (not shown in further detail).

In the exemplary embodiment, a throughflow direction of a leakage flow from a higher to a lower pressure level coincides with the axial direction A (horizontally from left to right in FIGS. 1 to 6).

The shells of the seal arrangement, in particular the aforementioned shells 1 to 3, all have the same constant V-shaped cross section over the entire length thereof, which is opened counter to said throughflow direction A. In addition, the straight thread axis of the shells, as can be seen in particular in the meridian plane in FIG. 2, is inclined counter to said throughflow direction and, with the radial direction R, includes an angle ρ of 45°, and with the throughflow and axial direction A accordingly a complementary angle of 90°−ρ, i.e. likewise 45°. The thread axis is parallel to the end faces of the shells, which are visible in FIG. 2 and which lie upstream in the throughflow direction (on the left in FIGS. 1 and 2).

In this way, the concave shells "trap" leakage flow and conduct it radially away from the radial gap toward the downstream edge of the V-shaped shells. The thus increased flow resistance lowers the leakage losses and thus increases the efficiency of the gas turbine.

FIG. 5 shows, in an illustration corresponding to FIG. 1, a seal arrangement according to a further embodiment of the present invention. Features corresponding to one another are denoted by identical reference signs, so that hereinbelow details will be provided only in relation to the differences with respect to the embodiment of FIG. 1 and for the rest reference will be made to the description thereof.

In the embodiment shown in FIG. 5, the shells have U-shaped rather than V-shaped cross sections, with shells 1, 3 adjacent in the axial direction likewise having a thread axis inclined counter to the throughflow direction A (cf. FIG. 2) and also opened cross sections.

As in the embodiment shown in FIG. 1, in the embodiment shown in FIG. 5, too, shells 1, 2 adjacent in the circumferential direction communicate with one another in the circumferential direction: leakage fluid can—in contrast to honeycomb seals—flow in the circumferential direction between the connecting edges of shells 1, 2 adjacent in the circumferential direction and connecting edges, aligned therewith, of shells 3 adjacent in the circumferential direction of a row adjacent in the axial direction, and thus take into account inhomogeneities and also a circumferential component.

FIGS. 3 and 4 show, in an illustration corresponding to FIGS. 1 and 2, a seal arrangement according to a further embodiment of the present invention. Features corresponding to one another are denoted by identical reference signs, so that hereinbelow details will be provided only in relation to the differences with respect to the embodiment of FIGS. 1 and 2 and for the rest reference will be made to the description thereof.

In the embodiment shown in FIG. 3, shells adjacent in the circumferential direction delimit cells closed in the circumferential direction, and therefore no fluid flow is possible between adjacent shells in the circumferential direction. The closed cells achieve an increased stability of the seal arrangement.

FIG. 6 finally shows, in an illustration corresponding to FIGS. 3 and 5, a seal arrangement according to a further embodiment of the present invention. Features corresponding to one another are denoted by identical reference signs, so that hereinbelow details will be provided only in relation to the differences with respect to the embodiment of FIGS. 3 and 5 and for the rest reference will be made to the description thereof.

As in the embodiment shown in FIG. 3, in the embodiment shown in FIG. 6, too, shells 1, 2 adjacent in the circumferential direction delimit cells closed in the circumferential direction, and therefore no fluid flow is possible between adjacent shells 1, 2 in the circumferential direction. As in the embodiment shown in FIG. 5, the shells have U-shaped cross sections, with shells adjacent in the axial direction likewise having a thread axis inclined counter to the throughflow direction A (cf. FIG. 4) and also opened cross sections.

The shells in the embodiments shown in FIGS. 1 to 6 are each produced integrally by means of a generative production process. To this end, provision is made—in the plane of the drawing in FIGS. 1, 3, 5 and 6—in each case of a thin powder or fluid layer, in this the cross sections of the shells are consolidated in certain regions or locally—for example by exposure to a laser or a mask or by applying a chemical by a needle nozzle—and in the process joined to the underlying layer, and then the non-consolidated powder or fluid is removed and a further, thin powder or fluid layer is provided, these steps being repeated until the shells have been built up generatively in layers in the radial direction R. Since the regions to be consolidated are positioned or offset counter to the throughflow direction A for each new layer, the concave, undercut shells can be shaped integrally with one another.

It is noted that the foregoing examples have been provided merely for the purpose of explanation and are in no way to be construed as limiting of the present invention.

While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects.

Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

LIST OF REFERENCE SIGNS

1-3 Shell
A Axial direction
U Circumferential direction
R Radial direction

What is claimed is:

1. A seal arrangement for a turbomachine, wherein the arrangement comprises a plurality of rows, arranged in succession in axial direction, of shells connected to one another in circumferential direction and having at least substantially a V-shaped cross section, wherein shells adjacent in the axial direction have cross sections opened counter to a throughflow direction and a thread axis inclined counter to the throughflow direction, the thread axis of a shell being inclined at an angle to a radial direction of from 5° to 60°, and wherein shells adjacent in circumferential direction delimit cells closed in circumferential direction.

2. The seal arrangement of claim 1, wherein cross sections of shells arranged in succession in axial direction are aligned in axial direction.

3. The seal arrangement of claim 1, wherein the thread axis of a shell is inclined at an angle to the radial direction of from 10° to 50°.

4. A process for producing the seal arrangement of claim 1, wherein the process comprises producing shells of the seal arrangement in layers by a generative process.

5. A turbomachine, wherein the turbomachine comprises a seal arrangement which is arranged on a rotor of the turbomachine and comprises a plurality of rows, arranged in succession in axial direction, of shells connected to one another in circumferential direction and having at least substantially a V-shaped or U-shaped cross section, shells adjacent in the axial direction having cross sections opened counter to a throughflow direction and a thread axis inclined counter to the throughflow direction, the thread axis of a shell being inclined at an angle to a radial direction of from 5° to 60°, and shells adjacent in circumferential direction delimiting cells closed in circumferential direction.

6. The turbomachine of claim 5, wherein the turbomachine is a gas turbine.

7. The turbomachine of claim 5, wherein shells at least substantially have a V-shaped cross section.

8. The turbomachine of claim 5, wherein shells at least substantially have a U-shaped cross section.

9. A seal arrangement for a turbomachine, wherein the arrangement comprises a plurality of rows, arranged in succession in axial direction, of shells connected to one another in circumferential direction and having at least substantially a U-shaped cross section, wherein shells adjacent in the axial direction have cross sections opened counter to a throughflow direction and a thread axis inclined counter to the throughflow direction, the thread axis of a shell being inclined at an angle to a radial direction of from 5° to 60°, and wherein shells adjacent in circumferential direction communicate with one another in circumferential direction.

10. The seal arrangement of claim 9, wherein cross sections of shells arranged in succession in axial direction are aligned in axial direction.

11. The seal arrangement of claim 9, wherein the thread axis of a shell is inclined at an angle to the radial direction of from 10° to 60°.

12. The seal arrangement of claim 9, wherein the thread axis of a shell is inclined at an angle to the radial direction of from 10° to 50°.

13. A process for producing the seal arrangement of claim 9, wherein the process comprises producing shells of the seal arrangement in layers by a generative process.

14. A turbomachine, wherein the turbomachine comprises a seal arrangement which is arranged on a rotor of the turbomachine and comprises a plurality of rows, arranged in succession in axial direction, of shells connected to one another in circumferential direction and having at least substantially a U-shaped cross section, shells adjacent in the axial direction having cross sections opened counter to a throughflow direction and a thread axis inclined counter to the throughflow direction, the thread axis of a shell being inclined at an angle to a radial direction of from 5° to 60°.

15. The turbomachine of claim 14, wherein the turbomachine is a gas turbine.

16. The turbomachine of claim 14, wherein cross sections of shells arranged in succession in axial direction are aligned in axial direction.

17. The turbomachine of claim 14, wherein the thread axis of a shell is inclined at an angle to the radial direction of from 10° to 60°.

18. The turbomachine of claim 14, wherein the thread axis of a shell is inclined at an angle to the radial direction of from 10° to 50°.

* * * * *